Oct. 28, 1947.  F. J. CHURNELL  2,429,611
CABLE STRIPPING DEVICE
Filed June 7, 1945  3 Sheets-Sheet 1
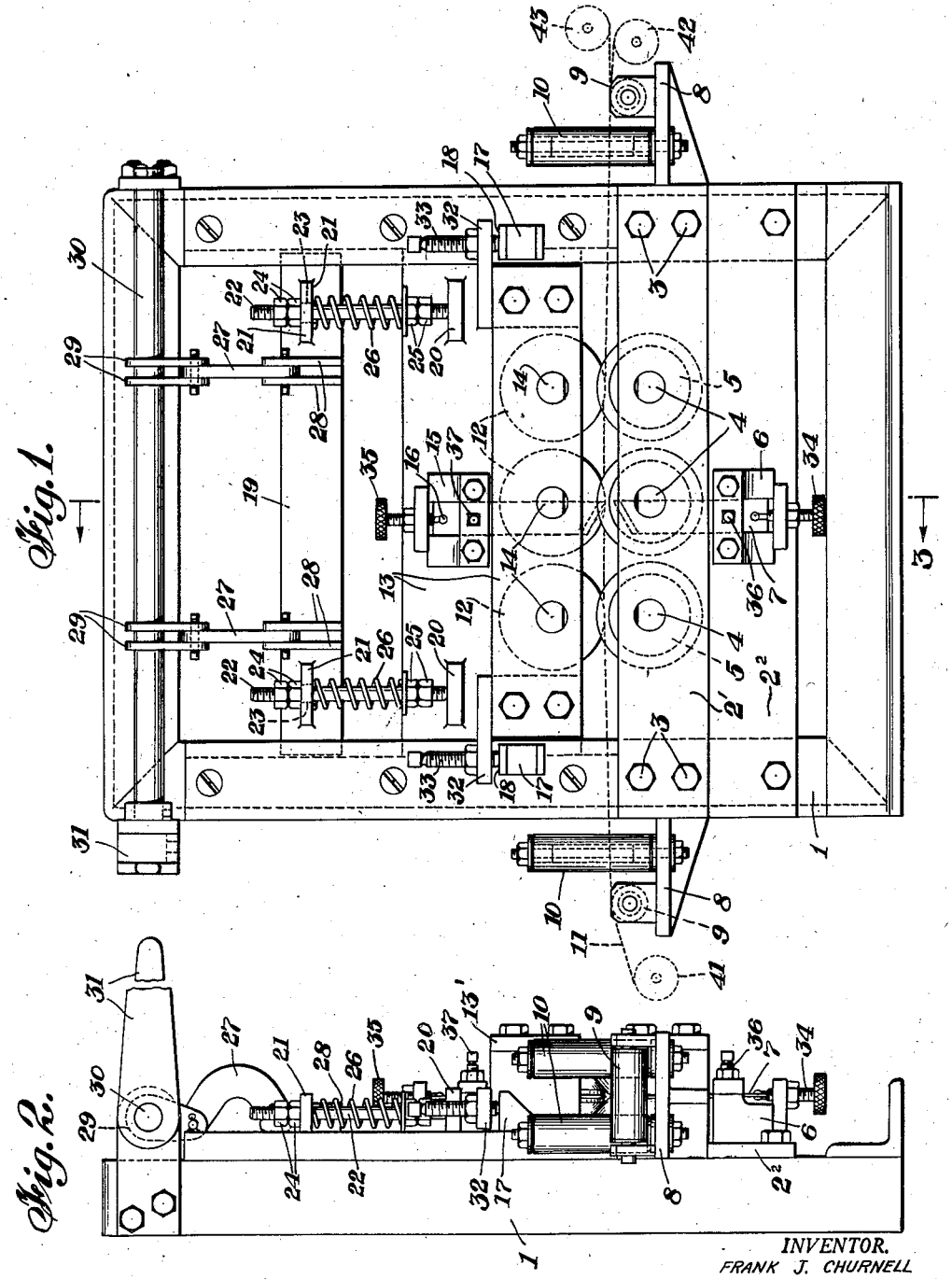
INVENTOR.
FRANK J. CHURNELL
BY
ATTORNEY

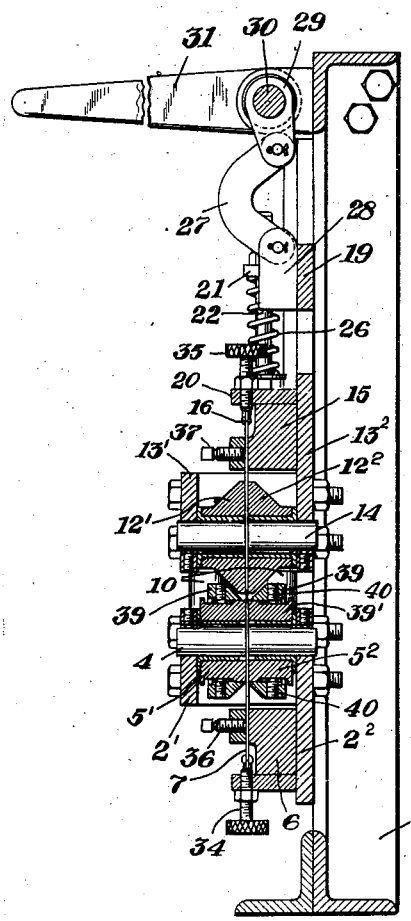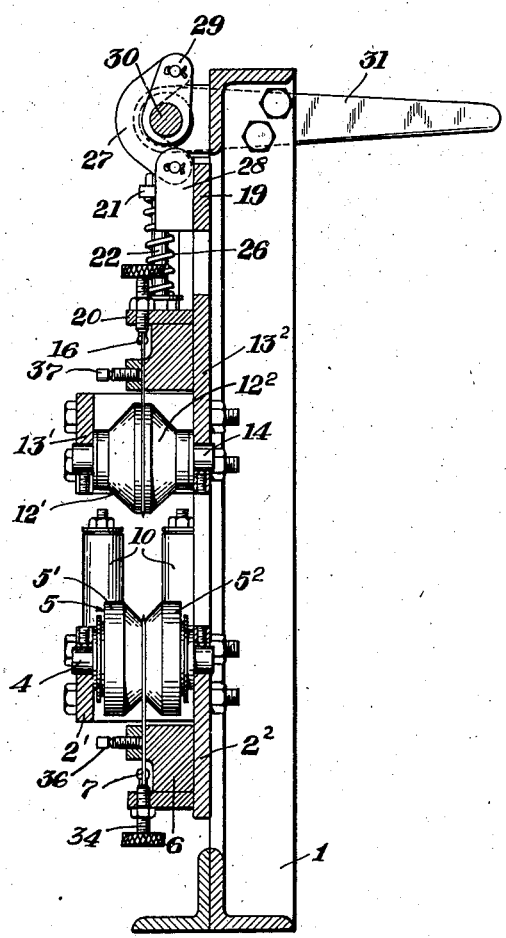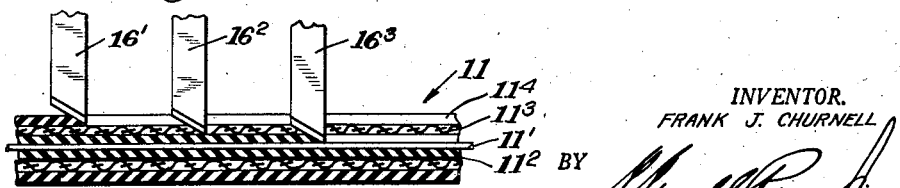

Oct. 28, 1947.  F. J. CHURNELL  2,429,611
CABLE STRIPPING DEVICE
Filed June 7, 1945  3 Sheets-Sheet 3

INVENTOR.
FRANK J. CHURNELL
BY
ATTORNEY

Patented Oct. 28, 1947

2,429,611

UNITED STATES PATENT OFFICE 2,429,611

CABLE STRIPPING DEVICE

Frank J. Churnell, Bloomfield, N. J., assignor to Federal Telephone and Radio Corporation, New York, N. Y., a corporation of Delaware Application June 7, 1945, Serial No. 598,007

6 Claims. (Cl. 164—39)

This invention relates to a cable stripping device and particularly to a device capable of stripping insulating material, metal braid or any other layer arranged around the conductor of a cable.

It is desirable to save the material of cables, for example high frequency cable, which do not show the desired characteristics, and in order to enable the re-use of each one of the materials used in the manufacturing process of cables, it is preferable to strip off each layer of the used materials separately.

It is the main object of the present invention to provide means for stripping off different layers of a cable by providing a knife which penetrates a slot formed by two parts of a split wheel, which arrangement allows the cutting of the cable just below the center of the wheel where the main pressure is exerted upon the cable during its travel through the device.

It is another object of the present invention to provide a plurality of guiding means for the proper positioning of the cable during the cutting.

It is still another object of the present invention to provide means for lifting one set of the guiding means so that the cable can be inserted easily into the stripping device.

It is still a further object of the present invention to provide a plurality of knives one behind the other and each following knife penetrating the cable just one layer deeper than the previous one, in order to cut all layers in one travel of the knife.

With these and other objects in view the present invention will become apparent and clearly understood in connection with the accompanying drawings, in which:

Figure 1 is an elevational view of the cable stripping device;

Fig. 2 is a side view of the device shown in Fig. 1;

Figs. 3 and 4 are sectional views along the lines 3—3 of Fig. 1, the position of the upper wheels being shown in the operative lowered and inoperative raised position, respectively;

Fig. 8 is a diagrammatic view of another embodiment of the invention demonstrating simultaneous cutting of more than one layer.

Figure 5:
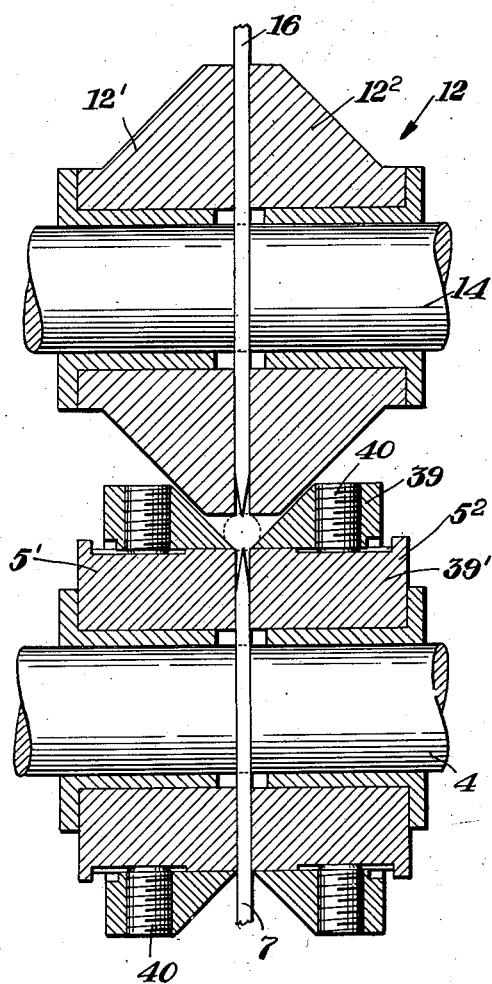
Figs. 5 and 6 show the relative position of the upper and lower wheels and particularly the collar arranged on the lower wheel in a narrowed and extremely outside extending position, respectively.

Referring now to the drawings, the cable stripping device consists of a vertically extending frame 1 which may be integrally formed or consist of several connected parts. At some distance above the lower end of the frame 1, a pair of laterally spaced, parallel cross bars $2^1$ and $2^2$ are fastened by bolts 3 or other like means. Preferably three axles 4 are mounted in the cross bars $2^1$ and $2^2$, which axles 4 carry preferably three freely turnable guiding wheels 5. One of the cross bars $2^1$ is extended downwards in order to provide a support 6 for a knife 7 which is adjustably mounted in the support 6 as described later.

The frame 1 which is preferably of generally rectangular shape and comprises mainly an upper, a lower and two side parts, is equipped with two oppositely extending brackets 8 connected to the side parts of the frame 1 and each adapted to support one horizontally arranged roller 9 and two vertically arranged rollers 10 so that the cable is supported by the horizontal roller and moved between the two vertical rollers. The two vertical rollers 10 and the horizontal roller 9 provide a good guiding means for the entrance of the cable into and its exit from the stripping device.

The cable 11 is guided within the stripping device by two sets of preferably three wheels. The lower set of the wheels has been described before, while the upper set of the wheels 12 is freely mounted similarly on two cross bars $13^1$ and $13^2$ by means of axles 14. The cross bars $13^1$ and $13^2$ are not fastened to the side parts of the frame 1, but are free to move in vertical direction, being guided by the side parts of the frame 1. An extension of one of the cross bars $13^2$ carries a support 15 which is adapted to carry a knife 16 adjustably set in the support 15 as described later.

Both side parts of the frame 1 are further equipped with a pair of abutment brackets 17 each providing a horizontally extending abutment face 18. Another cross bar 19 is provided above the first pair of cross bars $13^1$ and $13^2$ at some distance from the latter. Horizontal extensions 20 are provided on one of the cross bars $13^2$ and a second pair of horizontal extensions 21 are provided on the cross bar 19. A threaded bolt 22 is screwed into each extension 20 of the cross bar $13^2$, whereas the bolt 22 moves freely through a boring 23 of the extensions 21 of the cross bar 19. Two nuts 24 screwed on the upper end of each threaded bolt 22 abut against the upper face of the extensions 21. Two nuts 25 are arranged near the lower end of each threaded bolt 22 to provide support for the lower end of a spring 26 which presses against the lower face of the extensions 21 at its upper end and, as stated before, against the nuts 25 at its lower end. By this arrangement it is possible to lift the cross bars 13¹ and 13² and thereby the upper set of the wheels 12 along the side parts of the frame 1 when the cross bar 19 is lifted, while at the same time the upper wheels 12 together with the cross bars 13¹ and 13² can move vertically relatively to the cross bar 19 without lifting the latter. By moving the nuts 24 and 25, respectively, upwards or downwards on the threaded bolt 22, proper predetermined tension can be provided for the spring 26 for cables of different diameters. The first lifting movement serves the purpose of transferring the cross bars 13¹ and 13² and thereby the upper wheels 12 from the operative into inoperative position, whereas the latter lifting movement merely allows the upper wheels to be lifted in accommodation to a changed thickness of the cable without abandoning the operative position. Links 27 connect the upper cross bar 19 by means of bifurcated extensions 28 of the latter with bifurcated arms 29 mounted on a shaft 30 supported by the upper part of the frame 1. The shaft 30 can be turned 180° by operating a handle 31 keyed to the shaft 30, thereby moving the cross bar 19 by means of the links 27 and the cross bars 13¹ and 13² together with the set of wheels 12 by means of the threaded bolts 22 from the locked operative lower position (Fig. 3) into the locked inoperative position (Fig. 4). The locking of the two respective positions is achieved by having the arm 29 turned beyond its respective vertical positions.

One of the cross bars 13² is further equipped with side extensions 32 just above the abutment brackets 17 of the side parts of the frame 1. The extensions 32 receive set screws 33 the lower end of which abuts against the surface 18 of the abutment brackets 17. By setting the screws 33 the cross bars 13¹ and 13² and thereby the wheels 12 can be set to an extreme predetermined lowered position.

Figure 6:
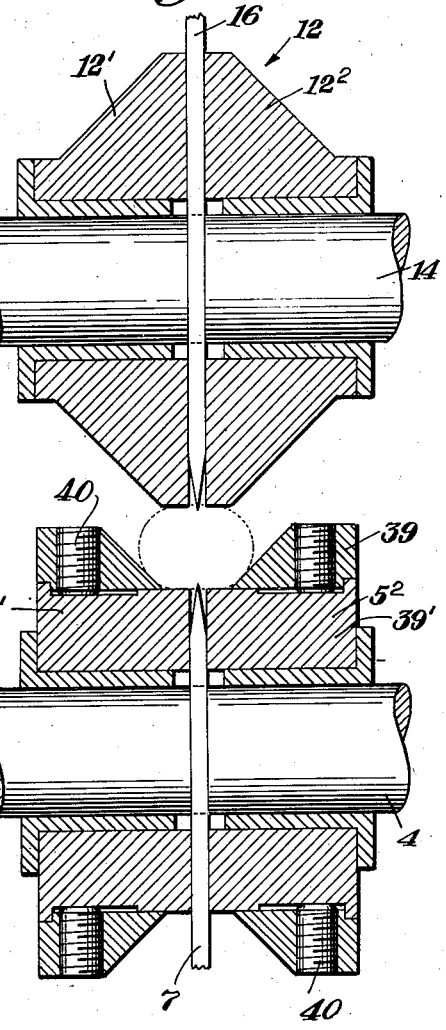
Figure 7:
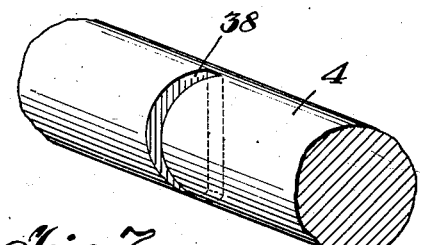
Fig. 7 is a perspective view of the axle for the wheels showing a sectional slot up to the center of the axle.

The upper wheels 12 as well as the lower wheels 5 are split and form two parts 5¹, 5² and 12¹, 12², respectively, (Figs. 3, 5 and 6). The knives 7 and 16 penetrate through the slots between the wheel parts and extend beyond the upper and lower wheels to a degree predetermined by means of the set screws 34 for the lower knife 7 and 35 for the upper knife 16. Fastening screws 36 and 37 pressing against the knives retain the latter in previously set, predetermined position. The front face of the knives 7 and 16 is arranged exactly in the center of the wheels 5 and 12, respectively, where the main pressure against the traveling cable 11 is exerted. In order to allow penetration of the knives through the center of the wheel the axles 4 are provided with a slot 38 (Fig. 7), which slot is arranged in the axle up to its axis.

The upper wheels are of generally V cross-section (see Figs. 3–6) whereas the lower wheels are of a cross section complementary to the cross section of the upper wheels. In order to provide accommodation means for different cross sections of the cable to be stripped each part of the lower wheels includes two separate movable, oppositely directed face members 39 which can be moved in axial direction upon a cylindrical base 39′ from an innermost position to an extreme outer position upon release of set screws 40. Figs. 5 and 6 show the face members 39 in two different positions to accommodate a cable of small circular cross section (Fig. 5) and of large oval cross section (Fig. 6), respectively.

In order to strip the cable of the different layers as for instance of the insulation or of the metal braid, etc., it is necessary to introduce the end of a cable 11 which is wound on a drum 41, through the rollers 9 and 10 (left side of Fig. 1) into the stripping device. For this purpose the upper set of wheels 12 is raised by shifting the hand lever 31 from the position shown in Fig. 3 over 180° into the position shown in Fig. 4. Then the face members 39 of the lower wheels 5 are set by raising and tightening the set screws 40 into the proper position conforming with the cross section of the cable 11 to be stripped. The cable is then set on the three lower wheels 5 and the end again pushed through the rollers 10 and 9 of the right end of the stripping device. A comparatively short length of the cable end is then split open and the insulation or any other layer removed from the cable for a certain length by hand and preferably, but not necessarily wound over a drum 42 at the right end of the stripping device. The cable itself which has just been stripped off is wound over a second drum 43 and each drum preferably operated by a separate motor (not shown) so that each drum can be stopped in case of strain either on the insulation strip or the cable. After this preliminary setting the rotating of the drums 42 and 43 will pull the cable through the entrance rollers 9 and 10 of the two wheel sets 5 and 12, respectively, after the upper wheel set has been lowered again by returning the hand lever 31 from the position shown in Fig. 4 to that shown in Fig. 3 and through the exit rollers 10 and 9. During the travel of the cable 11 between the lower and upper wheels 5 and 12 the knife 7 or 16 or even both at the same time, which have been set to project a predetermined distance beyond the periphery of the wheels, will split the cable and upon leaving the roller 9 the insulation will be taken off and wound on the drum 42, whereas the stripped cable itself will be wound on the drum 42. Other driving means than those of driving the drums 42 and 43 can be provided, as for instance, one or more of the pairs of wheels 5 and 12 can be driven through any suitable means. Should the cross section of the travelling cable change in size the wheels 12 will be pressed upwards thereby compressing the spring 26 arranged between the cross bars 13¹ and 13² and 19. These springs 26 will again return the wheels to their previous position and thereby the wheels 5 and 12 will remain in operative position during the entire travel of the cable 11 through the stripping device.

When the entire cable 11, in case it is an insulated shielded cable, has passed the stripping device and is stripped of the insulation layer during this operation, either the cable is provided with a new jacket or insulating layer or the drum 43 is returned to the other side of the stripping device in the place where the drum 41 is shown, and the entire cable again run through the stripping device, this time splitting the metal braid and the remaining cable on a drum 43. This procedure can be repeated until all layers are stripped off the cable. As a further development each one of the upper or lower, or also both, wheels can be provided with a knife, set at different levels, so that the knife of the first wheel cuts the insulation, the knife of the second wheel the metal braid, and the knife of the third wheel any further layer. By this arrangement only one travel of the cable through the stripping device is necessary in order to strip off the cable entirely of all its layers. Fig. 8 illustrates this embodiment of the invention diagrammatically by showing a cable 11 in cross section comprising for instance a conductor $11^1$, an insulating layer $11^2$ around the conductor $11^1$, a braid $11^3$ around the layer $11^2$ and finally another insulating layer $11^4$ around the braid $11^3$. Each one of the three upper wheels 16 are equipped with a knife $16^1$, $16^2$ and $16^3$, respectively, which knives are set at different levels in such a way that the knife $16^1$ in the first wheel penetrates and cuts the outer insulating layer $11^4$, the knife $16^2$ in the second upper wheel penetrates and cuts the metal braid $11^3$, and finally the knife $16^3$ in the third upper wheel penetrates and cuts the inner insulating layer $11^2$. In this case as many drums are provided at the right end of the stripping device as layers have been stripped off the cable in addition to the drum for the conductor.

While I have disclosed the principles of my invention in connection with several different embodiments, it will be understood that these embodiments are given by way of example only and not as limiting the scope of the invention as set forth in the objects and the appended claims.

What I claim is:

1. In a device for stripping a cable, a frame, a pair of spaced lower cross bars secured to said frame, a pair of spaced upper cross bars slidably mounted for vertical movement along said frame, at least one lower wheel freely rotatably mounted between said lower cross bars, and at least one upper wheel freely rotatably mounted between said upper cross bars and immediately above the lower wheel, said wheels adapted to receive between them a cable to be stripped, said wheels comprising two parts forming a slot between said two parts, spring means urging one of said wheels toward the cable and the other wheel, whereby the distance between said wheels may vary in accordance with the thickness of the said cable, a knife adjustably mounted in the direction to the cable and penetrating through and beyond the slot formed between the two parts of at least one of said wheels, and means for moving one of said wheels into and out of contact with the cable.

2. In a device for stripping a cable, as set forth in claim 1, in which said moving means comprises another cross bar mounted for vertical sliding movement on said frame above and spaced from said upper cross bars, a horizontally extending shaft having arms mounted above and spaced from said other cross bar, means interconnecting said upper cross bars with said other cross bar, said spring means arranged between said upper cross bars and said other cross bar, link members between said other cross bar and said arms of said shaft, said link members being adapted to lift said other cross bar and thereby said upper cross bars by means of said interconnecting means upon turning of said shaft.

3. In a device, as set forth in claim 1, the combination of another cross bar being mounted above and spaced from said upper cross bars, connecting bolts having their lower end fastened to said upper cross bars and their upper end movable relatively to said other cross bar, abutment means preventing movement in one direction between said connecting bolts and said other cross bar, said spring means being arranged between said upper cross bars and said other cross bar in order to allow upward movement of said upper cross bars against pressure of said springs.

4. In a device for stripping a cable, a frame, at least one upper and at least one lower wheel, means for rotatably mounting said wheels in said frame, both wheels adapted to receive between them a cable to be stripped, an adjustably mounted knife penetrating through and beyond at least one of said wheels, one of said wheels movable away from said other wheel, abutment means on said frame and set screws on said mounting means of said movable wheel, said set screws abutting against said abutment means, in order to limit the approach between said wheels.

5. In a device for stripping a cable, a frame, a plurality of upper and lower wheels, means for rotatably mounting said wheels in said frame, said wheels adapted to receive between them a cable to be stripped, and a knife adjustably mounted independently of said wheel and penetrating through and beyond at least one of each of said upper or lower wheels.

6. The combination, according to claim 5, in which the knives penetrate increasingly beyond the wheels in the direction of movement of the cable to be stripped.

FRANK J. CHURNELL.

REFERENCES CITED

The following references are of record in the file of this patent:

FOREIGN PATENTS

| Number | Country | Date |
|--------|---------|------|
| 834,809 | France | Sept. 5, 1938 |
| 225,280 | Great Britain | Nov. 27, 1924 |